United States Patent

[15] 3,683,354

Enk

[45] Aug. 8, 1972

[54] DRILL, TAP, AND OTHER OBJECT DETECTOR

[72] Inventor: George W. Enk, 204 Omar St., Struthers, Ohio 44471

[22] Filed: July 27, 1970

[21] Appl. No.: 58,413

[52] U.S. Cl. ..................340/271, 324/174, 340/412, 307/252 W
[51] Int. Cl. ..............................................G08b 21/00
[58] Field of Search ......340/267, 271, 412; 324/174; 77/5 B; 328/75, 106, 107, 120; 307/223, 252 UA, 252 W

[56] References Cited

UNITED STATES PATENTS

| | | | |
|---|---|---|---|
| 3,246,219 | 4/1966 | Devol et al. | 340/174.1 F |
| 3,310,796 | 3/1967 | Sanders | 340/271 |
| 2,941,120 | 6/1960 | Harman et al. | 340/271 UX |
| 3,515,903 | 6/1970 | Striggow | 307/252 W |
| 3,339,434 | 9/1967 | Sparling | 77/5 |
| 3,133,457 | 5/1964 | Martens | 340/267 UX |
| 3,365,614 | 1/1968 | Luongo et al. | 340/271 X |
| 3,474,258 | 10/1969 | Nagy, Jr. | 307/252 W |
| 3,329,831 | 7/1967 | Abramson et al. | 328/106 X |
| 3,526,789 | 9/1970 | Gyugyi et al. | 307/223 X |

*Primary Examiner*—Thomas B. Habecker
*Assistant Examiner*—Marshall M. Curtis
*Attorney*—McGlynn, Reising, Milton and Ethington

[57] ABSTRACT

A drill rotation detector comprising a permanent magnet sensor disposed along side of the drill path to scan the fluted drill surface and produce pulses as long as the drill is rotating. The detector further includes an indicator and a pulse-responsive circuit for maintaining the indicator in one of two signal conditions as long as pulses are received but permitting the indicator to revert to the other condition if pulses are interrupted due to a failure of drill rotation. In a second embodiment, a plurality of sensors are connected to a single indicator by an interconnected plurality of coincidence gates to maintain the indicator in a first condition only as long as all monitored drills are operating properly.

13 Claims, 6 Drawing Figures

INVENTOR.
George W. Enk
BY
Barnard, McGlynn & Reising
ATTORNEYS

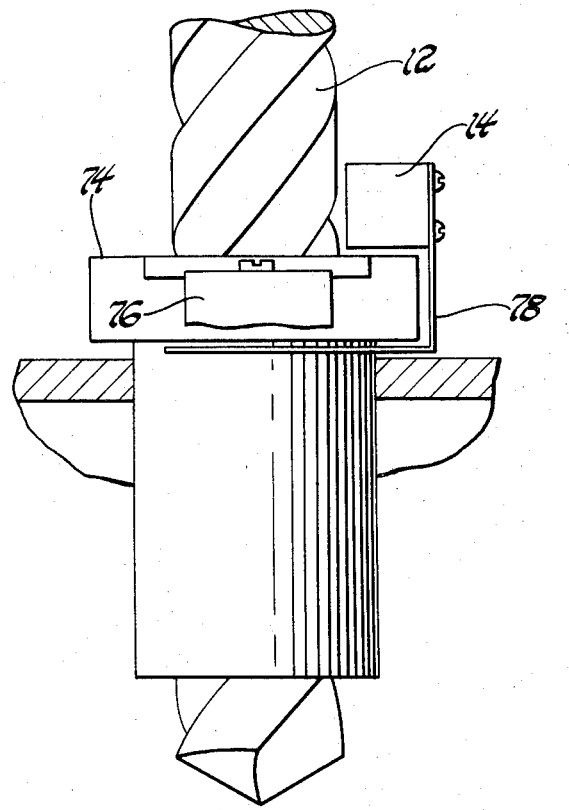
Fig. 4
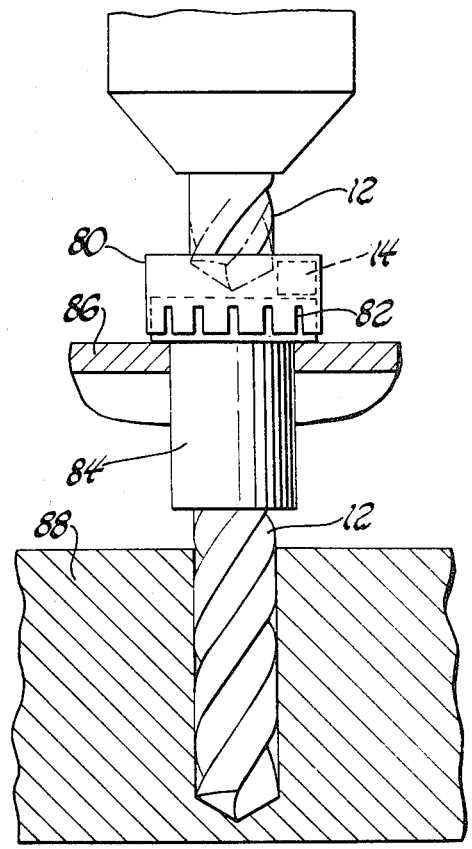
Fig. 5
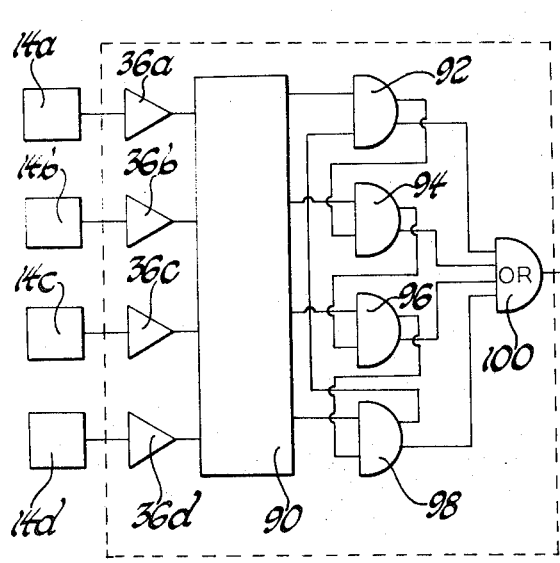
Fig. 6
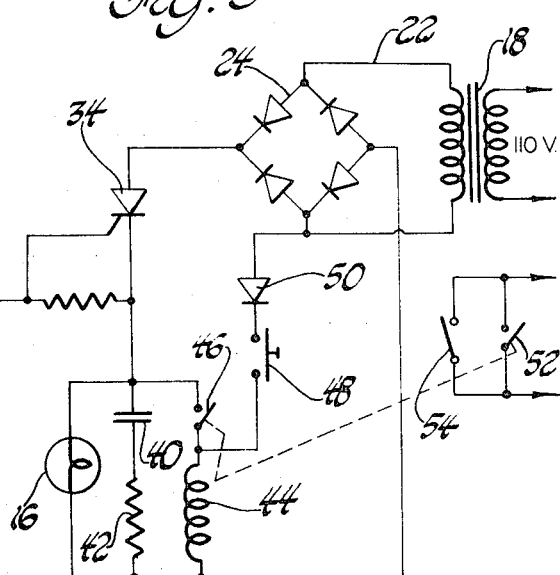
INVENTOR.
George W. Erk
BY
Barnard, McGlynn & Reising
ATTORNEYS

DRILL, TAP, AND OTHER OBJECT DETECTOR

This invention relates to drill rotation detectors.

The prior art discloses magnetic devices for detecting the presence of drills, taps, and other similar objects as well as devices for determining whether such tools are operating properly, i.e., rotating. The presence of a drill or other tool is most easily determined by means of a simple transformer arrangement wherein a primary and secondary coil are disposed in surrounding relationship to the tool, the tool thus forming a metallic core which promotes good flux linkage between the two coils as long as it is present. In the absence of the tool, the axial space between the coils is open and the inductive linkage is decreased. Tool rotation may be detected by a pair of poles which are disposed on diametrically opposite sides of a drill or other tool to vary a signal in a sinusoidal fashion in accordance with the diametric dimension of the tool which is between the poles at any given instant. The failure of rotation terminates the sinusoidal voltage and an indication is given.

The present invention relates to tool rotation sensors of the magnetic type but differs from the type wherein poles are disposed on diametrically opposite sides of a drill path in that the invention involves sensor means disposed along side of a drill path for effectively scanning the fluted or otherwise irregular surface of a drill, tap, or other such tool as long as it is rotating and producing distinct pulses upon the encountering of each edge or flute or other surface irregularity. The production of pulses permits positive signal detection using semiconductor devices. The present invention also eliminates the need for placing poles on opposite sides of the drill path although it may be advantageous in some instances to construct a support means which does, in fact, surround the tool path. The invention may thus be made adjustable for drills of different dimension.

In accordance a more specific feature of applicant's invention, sharp pulses are produced upon rotation of a monitored drill or other such tool so as to be capable of operating a pulse-responsive switch means such as an SCR. In general, this is accomplished by means of a sensor employing a U-shaped magnetic core which is disposed along side a drill path with the open ends of the core nearest the drill path and spaced apart by a gap which is small as compared to the diameter of the drill which is to be disposed in the path. Means such as a permanent magnet is employed for inducing flux in the core. As the drill in the drill path rotates, the flutes of the drill pass the gap in the core producing sharp pulses which may be applied to the gate electrode of an SCR for indicator control purposes.

In accordance with another feature of applicant's invention, the sensor may be applied to a drill guide bushing in such a way as to monitor the rotation of the drill in both advanced and substantially retracted positions. In accordance with a specific embodiment herein disclosed, the sensor is adjustably disposed on a drill guide bushing so as to be radially adjustable in accordance with drills of various sizes. In another specific embodiment disclosed herein, the sensor is integrated with a support collar which is easily snapped over a drill-guide bushing therefore to be easily disposed in place or removed.

Another feature of the present invention is the use of a single indicator to monitor a plurality of tools in such a fashion as to give an indication if any one of the tools fails to rotate. In general, this is accomplished by means of a plurality of sensors and a single indicator together with circuit means including a plurality of ring-connected coincidence gates between the sensors and the indicator. A coincidence gate is provided for each sensor, the outputs of the gates being interconnected with inputs of other gates in the fashion of a ring counter to produce a continuous sequence of pulses as long as all sensor means are producing pulses. However, if any sensor means fails to produce pulses, the ring is broken and an indication of failure is provided.

These and other advantages of the invention will be best understood by reading the following specification which sets forth in detail specific embodiments thereof. This specification is to be taken with the accompanying drawings of which:

FIG. 4 is a side view of a drill, drill-guide bushing, and sensor means;

FIG. 5 is a side view of another sensor means and support collar adapted for association with a drill-guide bushing; and, FIG. 6 is a schematic diagram of a multiple tool sensor system.

Figure 1:
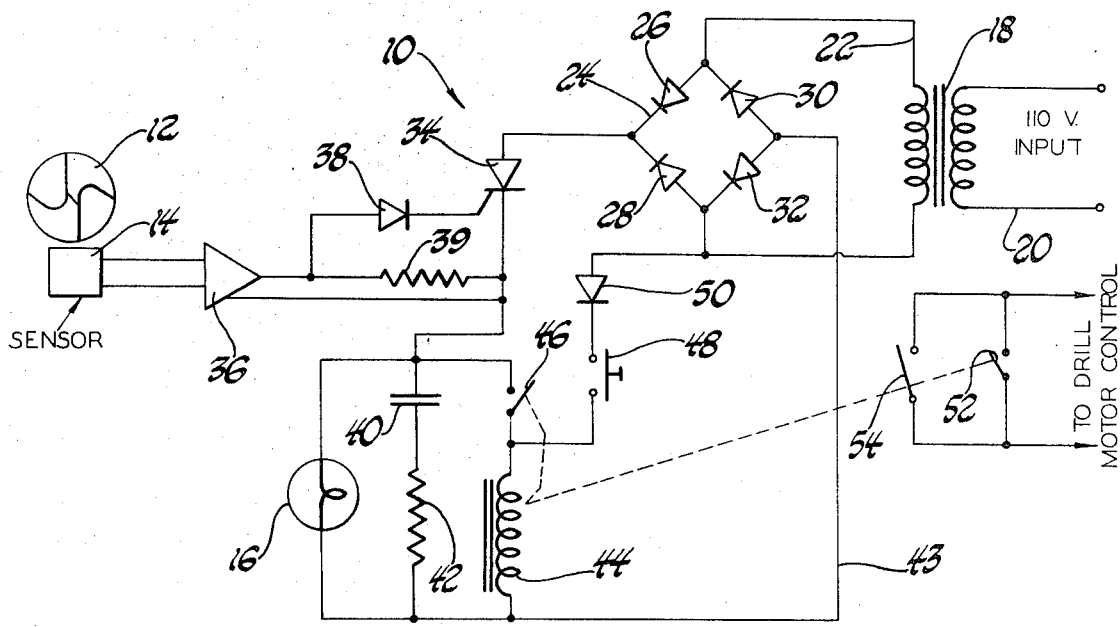
FIG. 1 is a schematic diagram of an illustrative embodiment of the invention.

Referring now to FIG. 1, there is shown a circuit 10 for monitoring the rotation of a conventional drill 12 and providing an indication whenever the drill 12 fails to rotate. Such a nonrotative condition may be due to drill breakage, bearing failure, or other malfunction in the drill-control system. The drill rotation detector comprises a sensor 14 of the magnetic type disposed along side the drill 12 and radially spaced therefrom by a small gap. Sensor 14 is thus effective to scan the peripheral surface of drill 12 and provide pulses in response to the continued rotation of drill 12. These pulses are employed to control the condition of an indicator lamp 16 having off and on states or conditions, the on condition being selected in this case to correspond with proper drill rotation.

The circuit 10 of FIG. 1 which responds to the pulses from sensor 14 to control the condition of indicator lamp 16 comprises an SCR switch 34 which is rendered conductive by the pulses. The power supply for switch 34 comprises an input transformer 18 having a primary winding adapted to receive one-hundred-ten volt AC current by way of a line 20 and a secondary winding which is connected in series with line 22. Line 22 is connected to a full-wave rectifier bridge 24 comprising diodes 26, 28, 30 and 32. The output of the full-wave rectifier bridge 24 is connected to the SCR switch 34 the gate electrode of which is connected to receive the pulses from sensor 14 by way of an input amplifier 36 and a diode 38. A bias level relative to the cathode of SCR 34 is provided by way of a resistor 39. The cathode or output electrode of SCR 34 is connected in series with a capacitor 40 and a current-limiting resistor 42. Resistor 42 is connected to the opposite side of the full-wave rectifier bridge 24 by way of line 43.

To briefly summarize the operation of the circuit 10 of FIG. 1 as thus far described, 110 volt AC current is applied to the isolation transformer 18, fully rectified by bridge 24 and applied to the anode electrode of SCR switch 34. As long as drill 12 is rotating, pulses are applied to the gate electrode of switch 34, thus, periodically gating it conductive. During a positive half-cycle of the input wave form, current flows through diode 26, switch 34, and indicator lamp 16, through return line 43, diode 32, and back to the secondary winding of transformer 18. During the negative half-cycles of the input wave form, current flows through diode 28, SCR 34, indicator lamp 16, return line 43, and diode 30. During the zero voltage crossover of the input waveform, a continuation of current through the indicator lamp 16 is provided by the capacitor 40 which briefly discharges to maintain a substantially constant current flow. The SCR switch 34 is effectively switched off by each zero crossing and must be switched back on by the continued rotation of drill 12 and the resulting production of gate pulses from the sensor 14. Therefore, in the absence of a continued flow of pulses from sensor 14, the SCR switch 34 is rendered non-conductive by the zero crossing condition and lamp 16 is extinguished to indicate a failure. The lamp 16 or another alarm device may alternatively be connected to come on in the absence of the pulses.

Describing now the control portion of the circuit 10 of FIG. 1, a relay coil 44 is connected in parallel with indicator lamp 16 to receive current from the SCR 34 through a pair of normally-opened contacts 46. The contacts 46 are controlled by the relay coil 44 such that the normally-opened contacts are maintained in the closed or conductive condition by the continuation of current flowing in the coil 44. To initially close contacts 46, a push button 48 in series with a half-wave rectifier diode 50 is provided. Momentary closure of push button 48 causes a flow of DC current through the coil 44 to close contacts 46. From this point on, the contacts 46 are maintained in the closed condition as long as coil 44 receives current pulses from SCR switch 34. Again, capacitor 40 insures coil 44 of current between pulses from sensor 14.

Relay coil 44 also controls normally-opened contacts 52 which are connected in series with the drill motor control circuit, not shown, to provide a "fail safe" mode of operation. Thus, whenever SCR switch 34 fails to receive gate pulses and is thereby rendered nonconductive on the next zero crossing of the input wave form, current no longer flows through indicator 16, thus, indicating that the drill 12 is no longer rotating properly. In addition, current no longer flows through relay 44, thus, permitting contacts 46 and 52 to open. The opening of contacts 52 stops the drill motor. It can further be seen that the depression of push button 48 will be momentarily effective to close contacts 46 and 52 but will not maintain the contacts in the closed condition after it is released unless current pulses are permitted to flow through SCR switch 34 upon release of the push button 48. Thus, a true fail safe mode of operation is provided.

Figure 2:
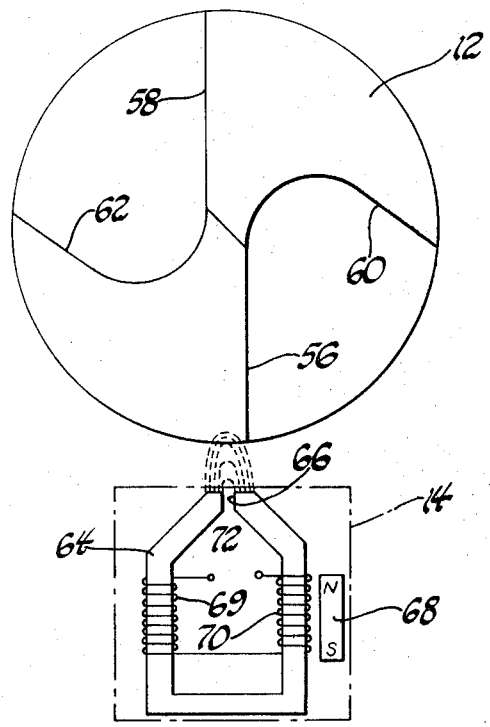
FIG. 2 is a schematic detail of a sensor means from the embodiment of FIG. 1.

Looking now to FIG. 2, the magnetic characteristics of the sensor 14 as well as the internal structure thereof is to be described in detail. In FIG. 2 drill 12 is shown to have a fluted configuration comprising a pair of cutting edges 56 and 58 followed by a pair of trailing edges 60 and 62, respectively. Sensor 14 comprises a low-reluctance U-shaped core 64, the legs of which are spaced apart to define a gap 66 which is small compared to the diameter of the drill 12 or the drill path which is normally occupied by the drill 12. To induce flux in the core 64, a small ceramic, permanent magnet 68 is disposed immediately adjacent one of the legs of the core. Flux variations in core 64 occur at a rate related to the passing circumferential surface of drill 12. Output windings 69 and 70 are connected in an additive fashion and link opposite legs of the core to provide pulses to the output terminals 72 which are connected to the amplifier 36 of FIG. 1. The core 64, along with windings 69 and 70 and the magnet are disposed in a nonconductive epoxy to form an integrated, oil tight sensor unit.

Describing the operation of the apparatus of FIG. 2, rotation of drill 12 in the counterclockwise direction as shown in FIG. 2 causes the cutting edges 56 and 58 and the trailing edges 60 and 62 to pass in proximity to the gap 66 of core 64. The rapid change in flux with respect to time which is produced by the passing of the sharp edges 56, 58, 60, and 62 produces current pulses in the output windings 69 and 70 which are added by virtue of the additive relation of the windings and applied to the amplifier 36. These pulses are in turn applied to the gate electrode of the SCR 34 to render the SCR conductive.

Figure 3:
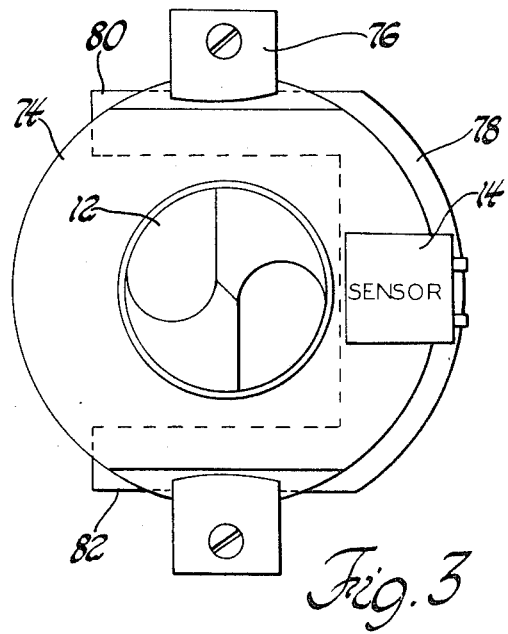
FIG. 3 is a detail of the support means for the sensor means.

Referring now to FIGS. 3 and 4, a first construction of the sensor 14 is illustrated. In FIGS. 3 and 4, drill 12 is surrounded by a drill-guide bushing 74 having a hold-down clamp 76 to maintain the bushing in the proper position with respect to the drill 12 and a workpiece, not shown. A U-shaped bracket 78 is connected to the drill-guide bushing 74 by way of the hold-down bracket 76. Bracket 78 carries the sensor 14 so, as best shown in FIG. 4, the gap 66 of the core 74 is radially spaced from but along side the drill 12 to produce pulses upon rotation of the drill as previously described. The bracket 78 permits the hold-down clamp 76 to be loosened slightly for radial adjustment of the sensor 14 relative to the drill 12. This accommodates a plurality of drill sizes and drill-guide bushing sizes and permits rapid and easy adjustment of the sensor 14.

Referring now to FIG. 5, a second embodiment of the sensor support is shown to comprise an annular support collar 80 having a radially notched lower portion 82 so as to render the collar 80 slightly expansible. This permits the collar 80 to be slipped over the upper end of a drill guide bushing 84 carried by a support plate 86. The sensor 14 is preferably integrated such as by potting, soldering, or brazing into the collar 80 in a proper position relative to the internal diameter thereof so as to be radially adjacent the drill 12 both when the drill is in the retracted or upper position shown in FIG. 5 and the extended position, that is, when in contact with the workpiece 88.

Referring now to FIG. 6, a circuit for monitoring the operation of a plurality of drills is shown to comprises a plurality of sensors 14a, 14b, 14c, and 14d each of which may be constructed in accordance with the illustration of FIG. 2. Sensors 14a, 14b, 14c, and 14d are connected through respective amplifiers 36a, 36b, 36c, and 36d to a Schmitt trigger circuit 90 having four channels for producing square wave forms in response to the pulses received from the sensors. Each pulse thus corresponds to either the leading or trailing edge of a substantially square and constant amplitude pulse produced by the four-channel circuit 90. The four channels of circuit 90 and the square waves which are produced in those channels are connected to respective inputs of a plurality of coincidence or AND gates 92, 94, 96, and 98. In addition, the output of gate 92 is connected to the input of gate 94, the output of gate 94 is connected to the input of gate 96, the output of gate 96 is connected to the input of gate 98, and the output of gate 98 is connected to the input of gate 92 in the fashion of a ring counter. The outputs of all of the coincidence gates, 92, 94, 96, and 98 are commonly connected to and OR gate 100 which produces an output when any one or more of the inputs is high. The output of OR gate 100 is connected to the gate electrode of SCR switch 34. The circuit of FIG. 6 is otherwise identical to the circuit of FIG. 1 and corresponding reference characters have been employed to indicate the identity between elements.

In operation, the sensors 14a, 14b, 14c, and 14d of the circuit of FIG. 6 are disposed adjacent respective drills in the manner shown in either FIG. 4 or 5. The pulses which are produced by the rotation of these drills are applied to the four channels of the Schmitt trigger circuit 90. The circuit 90 produces four square wave forms which are of a random phase relationship relative to one another. The outputs of the four channels of the Schmitt trigger circuit 90 are applied to one input of each of the coincidence gates 92, 94, 96, and 98. As long as the pulses continue to be received from all of the sensors 14a, 14b, 14c, and 14d, the coincidence gates 92, 94, 96, and 98 continue to conduct in a sequential fashion, the outputs being rendered conductive in order beginning with gate 92 and progressing through gate 94, 96, 98, and back to gate 92. Accordingly, OR gate 100 receives a train of input pulses and these pulses are applied to the gate electrode of SCR switch 34. Accordingly, rectified current from the bridge 24 continues to flow to the indicator lamp 16 and the relay coil 44 to maintain the contacts 46 and 52 in the closed condition. However, should pulses not be received from any one of the sensors 14a, 14b, and 14c, the AND gate which is associated with that sensor will receive only one input, that input coming from the preceding AND gate in the ring counter connection. With only one input, the gate does not conduct. Accordingly, the chain of pulse progression is broken and none of the succeeding AND gates can produce pulses. Therefore, OR gate 100 ultimately receives no pulses and SCR switch 34 is rendered conductive by the next zero crossing of the input supply wave form. Lamp 16 is, thus, extinguished and current ceases to flow through relay coil 44. The failure of current to flow through relay coil 44 permits contacts 46 and 52 to open thus terminating the operation of the various drill motors as previously described.

It can be seen that the circuits of FIGS. 1 and 6 may also be readily employed to count the number of rotations of a drill, tap, or other tool simply by applying the pulses from the sensor 14 to a register or other progressive counter, the output of which controls the drill, motor, or retract mechanism. This counting technique may be employed to produce a predetermined tap or drill depth or a predetermined number of drill or tap revolutions.

It is to be understood that the foregoing descriptions are illustrative in character and are not to be construed in a limiting sense.

The embodiments of the invention in which an exclusive property or privilege is claimed are defined as follows:

1. A drill rotation detector comprising: a plurality of sensor means for scanning the fluted surfaces of a plurality of drills and producing respective pulse trains at the rates the flutes are scanned; indicator means having first and second conditions; and circuit means responsive to the pulses collectively from the plurality of sensor means to maintain the indicator means in one condition and responsive to the absence of pulses from any one of said sensor means to place the indicator means in the other of said conditions, said circuit means comprising a plurality of coincidence gates, each having one input connected to receive pulses from a selected sensor means and another input connected to the output of a preceding gate.

2. A detector as defined in claim 1 wherein each sensor means comprises a U-shaped magnetic core disposed along side a drill path, means for inducing flux in the core, and means for responding to the changes in flux in the core to produce the pulses.

3. A detector as defined in claim 2 wherein the legs of the U-shaped core are spaced by a gap which is small as compared to the diameter of a drill in the path.

4. A detector as defined in claim 1 wherein the circuit means comprises an SCR having a gate electrode connected to receive the pulses from the sensor means.

5. A detector as defined in claim 4 including a full wave rectifier connected in circuit with the SCR to permit the application of AC power thereto.

6. A detector as defined in claim 1 wherein the indicator means comprises a lamp.

7. A sensor as defined in claim 1 wherein the means for inducing flux is a permanent magnet.

8. A detector as defined in claim 4 including relay means for disabling an external circuit in response to the failure of the SCR to conduct.

9. Apparatus for continuously detecting and indicating the rotation of a homogeneous, fluted, elongated and axially displaceable tool, such as a drill, comprising: tool guide means having an aperture through which the tool passes during the axial displacement thereof, sensor means including a discontinuous magnetic core carried by the guide means and having pole pieces defining a gap, both of said pole pieces being disposed adjacent, but radially spaced from one side of the tool when in the tool guide aperture, means for inducing a flux in the core and in the gap adjacent the tool guide aperture whereby rotation of the flutes of the tool past the gap produce a time-varying amplitude in the flux in the core, winding means on the core for producing electrical pulses in response to the time-varying amplitude of the flux flow whereby the rate of occurrence of said pulses is related to the rate of rotation of said tool, indicator means having first and second conditions, and circuit means connecting the winding means and the indicator means and being responsive to the pulses for maintaining the indicator means in one of the conditions so long as pulses from said probe are received at a predetermined rate but placing the indicator means in the other of said conditions when pulses are not received at the predetermined rate.

10. Apparatus as defined in claim 9 wherein the gap is small as compared to the diameter of the tool in the tool guide means.

11. Apparatus as defined in claim 10 wherein the sensor means comprises a U-shaped bracket connected to the tool guide means and carrying the core, said bracket being radially adjustable relative to the tool guide means to accommodate tools of varying radial dimension.

12. Apparatus as defined in claim 9 wherein said means for inducing is a permanent magnet carried by the sensor means adjacent said core.

13. Apparatus as defined in claim 9 wherein said sensor means comprises an expansible collar adapted to fit over and be supported by a drill guide bushing, said core being carried by said collar.

* * * * *